Aug. 30, 1966   N. L. WEINBERG   3,270,330
ICE DETECTING APPARATUS
Filed Nov. 4, 1963

NORMAN L. WEINBERG
INVENTOR.

BY Samuel Lindenberg
Arthur Freilich
ATTORNEYS

United States Patent Office 3,270,330
Patented August 30, 1966

3,270,330
ICE DETECTING APPARATUS
Norman L. Weinberg, Haifa, Israel, assignor to
Stanley Weinberg, Los Angeles, Calif.
Filed Nov. 4, 1963, Ser. No. 321,064
7 Claims. (Cl. 340—234)

This invention relates generally to ice detecting apparatus and more particularly to such apparatus which is suitable for use on aircraft wings to detect ice formation thereon.

The formation of ice on aircraft wings has always represented a serious hazard to air travel since such formation can change the wing camber and increase drag which in extreme situations can reduce the available lift to a very dangerous level. Consequently, most modern aircraft are provided with a de-icing system selectively actuatable by a crew member for removing any formed ice.

Since it would be exceedingly desirable to prevent the formation of ice, rather than remove it after it has formed, it is an object of this invention to provide apparatus, which can be used on aircraft wings, for indicating impending ice formation before such formation actually occurs on the wing.

It is a further object of this invention to provide such an ice detecting apparatus which is simple in construction, reliable in operation, and relatively inexpensive to provide.

Briefly, the invention herein is directed to ice detecting apparatus in which a mechanically vibratabe transducer, such as a piezoelectric crystal, is connected in an oscillator circuit and is exposed to an area, such as an aircraft wing, being monitored for ice formation. The transducer is so mounted that ice formation prevents it from vibrating which in turn prevents the oscillator circuit from oscillating. The oscillatory signal normally provided by the oscillator circuit is sensed by a detecting apparatus which in response to a cessation of oscillations operates an indicator, and optionally, a de-icing system. The detecting apparatus is able to indicate ice formation before it actually occurs by collecting water on the wing and exposing it to a surface having a higher heat conductivity than that of the wing material so that the collected water forms ice prior to any serious ice formation on the wing. For heavy aircraft that are capable of flying through ice forming conditions, a heating element can optionally be momentarily provided as part of the apparatus. Where a heating element is used, it is momentarily energized in response to a cessation of oscillations to melt any formed ice which prevents transducer vibration. The freed transducer will therefore vibrate again until newly formed ice again locks it up. The frequency at which the heating element is energized can be used as an indicator to describe the degree of the ice forming condition.

The novel features that are considered characteristic of this invention are set forth with particularity in the appended claims. The invention itself both as to its organization and method of operation, as well as additional objects and adavntages thereof, will best be understood from the following description when read in connection with the accompanying drawings, in which:

Figure 1:
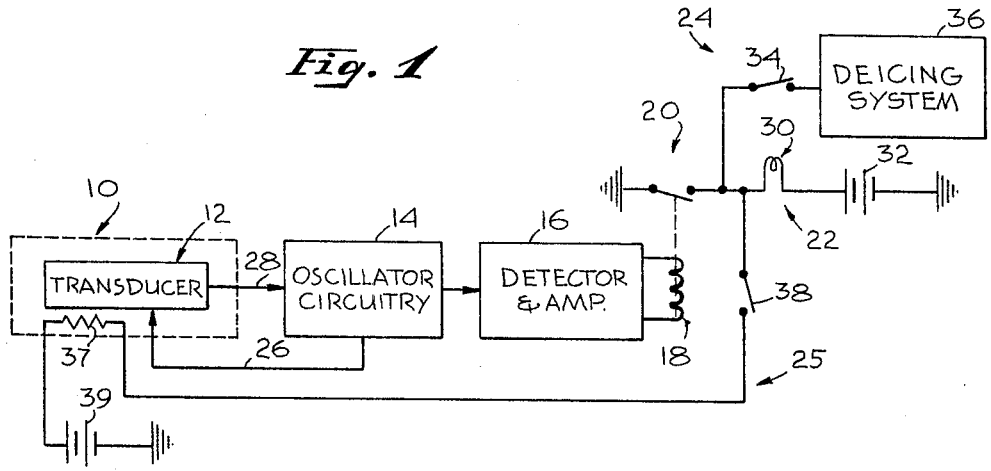
FIGURE 1 is a schematic block diagram of an ice detecting ssytem constructed in accordance with the invention.

Attention is now called to FIGURE 1 of the drawings which comprises a schematic block diagram of a detecting system constructed in accordance with the present invention and including a transducer assembly 10 including a transducer 12, e.g. a piezoelectric crystal, connected in a feedback loop with oscillator circuitry 14. The output of the oscillator circuitry 14 is coupled to a detector and amplifier means 16 which controls a relay solenoid 18 which in turn operates a relay switch 20 connected in an indicating circuit 22, a de-icing system circuit 24, and a heating element circuit 26.

More particularly, the transducer 12 and oscillator circuitry 14 can together comprise any conventional crystal controlled, or similar type, oscillator circuit in which the oscillations depend upon the physical vibration of the transducer element. In such oscillator circuits, an electrical potential applied across the terminals of a crystal, as through the feedback circuit 26, causes a strain in the crystal which in turn causes it to develop an electric signal across its output terminals which is coupled to the oscillator circuitry 14 through conductor 28. A proper choice of circuit components enables an extremely stable oscillator circuit to be provided as is well known in the art.

The output of the oscillator circuitry 14 comprises an oscillating electric signal whose frequency is dependent upon the natural frequency of the transducer 12. The detector and amplifier 16 comprise a filter tuned to the frequency of the oscillator circuit and one or more amplification stages. So long as the oscillator circuitry 14 provides an oscillating output signal, the detector and amplifier 16 will maintain the relay solenoid 18 energized which in turn will maintain the relay switch 20 open.

The relay switch 20 is connected between a source of reference potential, as ground, and first, second, and third series circuits. The first series circuit comprises an indicator circuit 22 including an indicator 30, e.g. a lamp, and a potential source 32 connected between the indicator 30 and a source of reference potential, as ground. The second series circuit 24 includes a switch 34 and means 36 for initiating operation of a de-icing system. The third series circuit 25 includes a heating element 37, a switch 38, and a source of potential 39.

In the operation of the apparatus of FIGURE 1, so long as the transducer 12 is free to vibrate, the oscillator circuitry 14 will provide an oscillating output signal to the detector and amplifier 16 to energize the relay solenoid 18 to maintain the relay switch 20 open. However, when vibration of the transducer 12 is prevented by ice formation, the relay solenoid 18 will be de-energized thereby permitting the relay switch 20 to close, consequently energizing the indicator 30. In addition, if the switch 34 is actuated under the control of an aircraft crew member, the means 36 for initiating operation of the de-icing system will be actuated. It is to be noted that concurrent operation of the relay switch 20 and switch 34 are necessary in order for the operation of the de-icing system to be initiated. Additionally, if switch 38 is closed, the heating element 37 will be energized. The heating element is disposed adjacent the transducer assembly, to be described in detail below, to melt any formed ice to thereby free the transducer. The rate at which the heating element is energized is indicative of the ice forming conditions.

It is pointed out that although a preferred embodiment of the invention contemplates the utilization of a piezoelectric crystal transducer in conjunction with the oscillator circuitry, other devices, e.g. vibrating reed arrangements, can be utilized to provide an oscillating signal to the detector and amplifier 16. It should be understood that the inventive concepts herein do not depend upon the provision of any particular oscillator arrangement but merely one which includes the utilization of a physically vibrating element.

Figure 2:
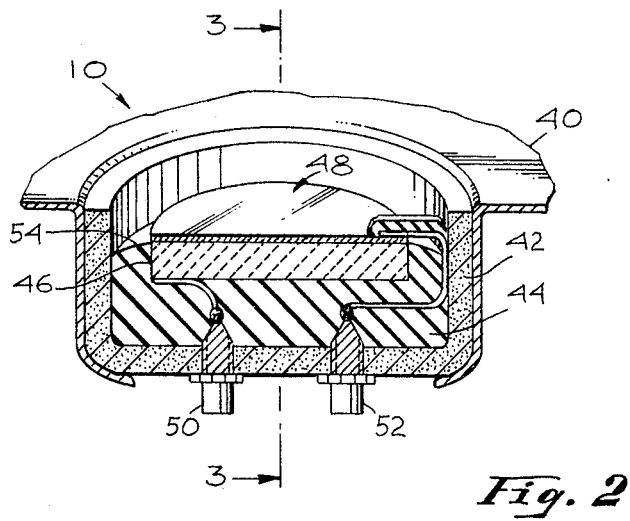
FIGURE 2 is a perspective view partially broken away of a transducer assembly adapted to be utilized in the system of FIGURE 1.

Attention is now called to FIGURE 2 which illustrates a perspective view of a transducer assembly suitable for use in the apparatus of FIGURE 1. The transducer assembly is adapted to be fitted into a recess in the metal surface of an aircraft wing 40. The assembly includes a substantially cylindrical cup 42 constructed of an insulative material, such as fiber. A substantially cylindrical compliant body 44 is fitted within the cup 42. Preferably, the body 44 should be formed of a relatively compliant material, such as rubber. A receptacle 46 is formed in the top surface of the body 44 and is adapted to receive therein a disc-shaped crystal transducer 48. Connected to the upper and lower surfaces of the crystal 48 are contacts 50 and 52 respectively. The upper and outer edge of the body 48 is obliquely formed to, together with the inner side of the cup wall, form a water collecting channel 54. Preferably, the crystal 48 projects out of the receptacle 46 somewhat above the uppermost portion of the body 44.

The top surface of the crystal 48 is covered with a material having an extremely high heat conductivity, as e.g. fuzed silver.

Figure 3:
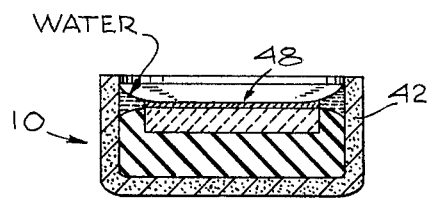
FIGURE 3 is a sectional view taken substantially along the plane 3—3 of FIGURE 2 and illustrating the manner in which water is collected in the water collecting channel.

In the operation of the transducer assembly 10, in the course of a flight, water will collect in the channel 54 formed between the upper outer edge of the body 44 and the inner wall of the cup 42, as shown in FIGURE 3. When the temperature is sufficiently low, ice will form in the channel and across the fuzed silver surface of the crystal so as to effectively prevent any physical movement thereof. So long as the crystal is unable to vibrate, the oscillator circuitry 14 of FIGURE 1 of course is unable to provide an oscillating signal output to the detector amplifier means 16.

Inasmuch as the fuzed silver has a higher heat conductivity than the aircraft wing material, the water in the transducer assembly will freeze faster than any water collecting on the aircraft wing. Consequently, the indicator 30 of FIGURE 1 will be able to signal impending wing ice formation to the crew prior to the actual ice formation on the wing. Thus far, it has been assumed that switch 38 in circuit 25 is open so that when relay switch 20 closes, it remains closed until temperatures subsequently rise to melt formed ice either naturally or as a result of energization of the de-icing system. When the ice melts, the crystal will be rapidly unlocked as a result of the crystal engagement with the relatively compliant body 44. As soon as the crystal is free to vibrate, the detector and amplifier 16 of FIGURE 1 will energize the relay solenoid 18 to in turn actuate the relay switch 20 to thereby open circuits 22 and 24.

If switch 38 is closed, then each time the crystal locks up, the heater element 38 is energized to melt the ice locking the crystal. As a consequence, the lamp 30 will be alternately energized and de-energized at a frequency which is proportional to the rate at which freezing is occurring.

In addition to the apparatus heretofore described functioning to indicate when ice formation sufficient to lock the crystal actually occurs, means (not shown) could be provided for sensing the stage or amount of ice formation of the water collected in the transducer assembly. That is, as ice begins to form within the transducer assembly, the resistance of the ice to the movement of the crystal 48 increases incrementally. As the ice formation in the transducer assembly builds up, the resistance to crystal movement increases and consequently the frequency of the output signal provided by the oscillator circuitry 14 decreases. The amplitude of the signal provided by the oscillator circuitry 14 will also decrease. These two factors which vary as a function of the degree of ice formation, can be utilized to develop analog signal for operating meter or other type indicators to advise the aircraft crew of the stage of ice formation.

From the foregoing, it should be appreciated that a preferred embodiment of ice detecting apparatus has been disclosed herein which relies on the cessation of an oscillating signal provided by an oscillator circuit including a physically vibratable transducer, such as a piezoelectric crystal, for indicating ice formation. It is reiterated that any crystal controlled oscillator circuit or other circuit controlled by a mechanically vibratable device, could be employed in accordance with the teachings herein. Moreover, it is emphasized that although the described embodiment of the invention is directed principally to apparatus for detecting ice on aircraft wings, it should of course be appreciated that the invention finds similar utility in any other application where it is desirable to sense the formation of ice.

What is claimed is:

1. Apparatus for monitoring a structure for detecting the formation of ice thereon, said apparatus comprising:
    a transducer;
    means for physically vibrating said transducer;
    means for mounting said transducer proximate to said structure;
    said means for mounting said transducer including a cup having a wall;
    means centrally mounting said transducer in said cup spaced from said wall;
    annular channel means disposed contiguously between said transducer and said wall for collecting water whereby ice formed from said collected water will physically lock said transducer to said wall; and
    detector means responsive to a cessation of said transducer vibration for providing an output signal.

2. The apparatus of claim 1 wherein said transducer is electrically connected in an oscillator circuit.

3. The apparatus of claim 2 wherein said transducer comprises a disc-shaped crystal.

4. The apparatus of claim 2 wherein said transducer is at least partially comprised of a material constituting a better heat conductor than the material of which said structure is comprised.

5. A transducer assembly suitable for detecting the formation of ice on a structure, said assembly comprising:
    a transducer;
    a cup member having a peripheral wall;
    means centrally mounting said transducer in said cup member spaced from said wall;
    annular channel means disposed contiguously between said transducer and said wall for collecting water whereby ice formed from said collected water will physically lock said transducer to said wall.

6. The structure of claim 5 including a relatively compliant body supported within said cup member;
    said body defining a receptacle for receiving said transducer.

7. The apparatus of claim 6 wherein said transducer comprises a disc-shaped crystal.

References Cited by the Examiner
UNITED STATES PATENTS

| | | | |
|---|---|---|---|
| 2,789,281 | 4/1957 | Short et al. | 340—234 |
| 2,800,647 | 7/1957 | Baerwald et al. | 340—234 |

NEIL C. READ, *Primary Examiner.*

R. M. ANGUS, D. YUSKO, *Assistant Examiners.*